US012220827B2

(12) United States Patent
Darwinkel et al.

(10) Patent No.: US 12,220,827 B2
(45) Date of Patent: Feb. 11, 2025

(54) SHAVER HEAD FOR AN ELECTRIC SHAVER

(71) Applicant: KONINKLIJKE PHILIPS N.V., Eindhoven (NL)

(72) Inventors: Geert-Jan Darwinkel, Winsum (NL); Alwin William De Vries, Zuidlaren (NL); Ivar Bosma, Oranjewoud (NL); Marcus Cornelis Petrelli, Groningen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 319 days.

(21) Appl. No.: 17/779,166

(22) PCT Filed: Nov. 25, 2020

(86) PCT No.: PCT/EP2020/083263
§ 371 (c)(1),
(2) Date: May 24, 2022

(87) PCT Pub. No.: WO2021/110492
PCT Pub. Date: Jun. 10, 2021

(65) Prior Publication Data
US 2022/0402153 A1 Dec. 22, 2022

(30) Foreign Application Priority Data
Dec. 4, 2019 (EP) .................................... 19213663

(51) Int. Cl.
*B26B 19/14* (2006.01)
*B26B 19/38* (2006.01)

(52) U.S. Cl.
CPC .......... *B26B 19/146* (2013.01); *B26B 19/145* (2013.01); *B26B 19/386* (2013.01)

(58) Field of Classification Search
CPC ..... B26B 19/02; B26B 19/145; B26B 19/146; B26B 19/3853; B26B 19/386
See application file for complete search history.

(56) References Cited

U.S. PATENT DOCUMENTS 4,711,028 A * 12/1987 Bergsma ............... B26B 19/386 30/346.51
4,910,869 A * 3/1990 Labrijn ............... B26B 19/3853 30/43.6
(Continued)

FOREIGN PATENT DOCUMENTS

CN 201128163 Y 10/2008
EP 0721826 A2 7/1996
(Continued)

OTHER PUBLICATIONS

International Search Report and Written Opinion Dated Feb. 17, 2021 for International Application No. PCT/EP2020/083263 Filed Nov. 25, 2020.

*Primary Examiner* — Adam J Eiseman
*Assistant Examiner* — Richard D Crosby, Jr.

(57) ABSTRACT

A shaver head for an electric shaver has at least two hair-cutting units, each of which includes an external cutting member and an internal cutting member that is rotatable relative to the external cutting member. Each of the hair-cutting units is supported by a supporting portion that is linearly movable under the bias of a spring member relative to a base portion of the shaver head between a first, retracted position and a second, extended position. The shaver head has a locking mechanism for selectively locking the supporting portion in a locked position relative to the base portion allowing a user to select different shaving modes.

20 Claims, 10 Drawing Sheets

(56) References Cited

U.S. PATENT DOCUMENTS

| | | | | |
|---|---|---|---|---|
| 5,423,125 | A | 6/1995 | Wetzel | |
| 5,687,481 | A | 11/1997 | De Boer | |
| 6,671,960 | B2 * | 1/2004 | Kawafune | B26B 19/141 30/346.51 |
| 6,722,038 | B2 * | 4/2004 | Visman | B26B 19/14 464/106 |
| 6,892,457 | B2 | 5/2005 | Shiba | |
| 8,533,960 | B1 * | 9/2013 | Barish | B26B 19/14 30/43.6 |
| 9,009,978 | B2 * | 4/2015 | Schneider | B26B 19/14 30/43.6 |
| 9,027,251 | B2 * | 5/2015 | Schmitt | B26B 19/14 30/41 |
| 10,357,890 | B2 * | 7/2019 | Yan | B26B 19/146 |
| 10,449,682 | B2 * | 10/2019 | Eijkelkamp | B26B 19/386 |
| 10,946,538 | B2 * | 3/2021 | Wind | B26B 19/386 |
| 11,267,145 | B2 * | 3/2022 | Horowitz | B26B 19/14 |
| 11,465,301 | B2 * | 10/2022 | Horowitz | B26B 19/145 |
| 2002/0017022 | A1 * | 2/2002 | Nakano | B26B 19/141 30/43.6 |
| 2005/0241153 | A1 * | 11/2005 | Koike | B26B 19/145 30/43.6 |
| 2007/0084059 | A1 * | 4/2007 | Hannan | B26B 19/145 30/43.5 |
| 2007/0089298 | A1 | 4/2007 | Shimizu | |
| 2008/0034591 | A1 | 2/2008 | Fung | |
| 2011/0030220 | A1 * | 2/2011 | Shimizu | B26B 19/145 30/527 |
| 2011/0173815 | A1 * | 7/2011 | Koike | B26B 19/145 30/43.6 |
| 2019/0389084 | A1 * | 12/2019 | Lap | B26B 19/3853 |

FOREIGN PATENT DOCUMENTS

| | | | |
|---|---|---|---|
| EP | 2246159 | A2 | 11/2010 |
| WO | 2015/025064 | A1 | 2/2015 |

* cited by examiner

SHAVER HEAD FOR AN ELECTRIC SHAVER

CROSS REFERENCE TO RELATED APPLICATIONS

This application is the U.S. National Phase application under 35 U.S.C. § 371 of International Application No. PCT/EP2020/083263 filed Nov. 25, 2020, which claims the benefit of European Patent Application Number 19213663.8 filed Dec. 4, 2019. These applications are hereby incorporated by reference herein.

FIELD OF THE INVENTION

This invention relates to a shaver head for an electric shaver, comprising a base portion for connection of the shaver head to a main housing of the electric shaver, a supporting portion mounted to the base portion, a linear guiding structure for enabling the supporting portion to linearly move in a movement direction relative to the base portion between a first, retracted, position and a second, extended, position, a spring member for biasing the supporting portion away from the base portion in the movement direction from the first position to the second position, and at least one hair-cutting unit supported by the supporting portion.

The invention also relates to an electric shaver comprising a shaver head as described here before.

BACKGROUND OF THE INVENTION

A shaver head and an electric shaver as described here before are disclosed by WO 2015/025064. The known shaver comprises a main housing and a hair-cutting module comprising three hair-cutting units that each comprise an external cutting member and an internal cutting member which is rotatable relative to the external cutting member. The hair-cutting module is displaceable relative to the main housing against spring force in a direction parallel to a main axis. The hair-cutting module is also tiltable relative to the main housing against spring force about at least one tilt axis extending perpendicularly to the main axis.

U.S. Pat. No. 6,892,457 B2 discloses an electric shaver with a shaver head comprising two hair-cutting units of the linearly reciprocating type, each comprising an elongated stationary foil with hair-entry openings and an internal cutter with a plurality of cutting elements which is driven into a linearly reciprocating motion in contact with an inner surface of the foil. The shaver head is mounted to a grip portion of the shaver by means of an elastic suspension arrangement. This suspension arrangement allows the shaver head to move in opposite directions towards and away from the grip portion, wherein the shaver head is biased away from the grip portion by spring force. This spring force provides a controlled contact force between the foils of the hair-cutting units and the skin in use, to improve the shaving performance and the comfort for the user.

The amount of the contact force between the foils and the skin during shaving translates into a corresponding amount of skin doming into the hair-entry openings of the foil. The amount of skin doming determines both the closeness of the hair-cutting process and the amount of skin irritation caused by contact of the skin with the moving internal cutters. Thus, the amount of skin doming is an important parameter which determines the balance between the closeness of shaving and any irritation or damage to the skin. It is for example known to take measures to reduce the applied contact force.

One approach for limiting the maximum contact force is to elastically suspend individual hair-cutting units relative to a surrounding skin-supporting structure, in order to prevent high peak forces on the hair-cutting units. This is known as a floating head approach.

Another approach to prevent high peak forces is to distribute the forces over a larger area. This may be achieved by enabling the individual hair-cutting units to pivot relative to each other and/or a surrounding supporting portion, so that they can adapt their orientations to the local contours of the face, and provide a maximum contact area.

A disadvantage of the suspension arrangement used in the known shaver head as described here before is that it reduces the controllability of the shaving process by the user. Some users find there is too much flexing of the shaver head relative to the grip portion during shaving, so that they cannot achieve the closeness of shave that they desire. Other users may instead experience too much contact force.

This is because the actual skin doming effect into the hair-entry openings of the external part of the hair-cutting unit is not the same for all users. A user's age, skin type and the environmental conditions will result in different skin doming effects, not directly related to the characteristics of the hair-cutting unit.

U.S. Pat. No. 5,423,125 discloses an electric shaver having a short-hair cutting system fitted on a housing and a sliding actuating switch fitted on the housing and configured to set a long-hair cutting system from an off-position to at least one operative position. In a first operative position or combination position, the long-hair trimmer is floating and capable of receding downwardly as a result of pressure on the long-hair trimmer. In a second operative position or trimming position, the long-hair trimmer is locked in position.

There is a need to prevent high peak forces on the skin during shaving, and thereby prevent skin irritation and damage (due to excessive skin doming), and also to maintain a good controllability of the shaving process and result, additionally in a way which can be adapted to different users. For example, some users may have less susceptibility to skin irritation (caused by pressure peaks) than others.

SUMMARY OF THE INVENTION

The invention is defined by the claims.

According to a first aspect of the invention, there is provided a shaver head for an electric shaver comprising:

- a base portion for connection of the shaver head to a main housing of the electric shaver;
- a supporting portion mounted to the base portion;
- a linear guiding structure for enabling the supporting portion to linearly move in a movement direction relative to the base portion between a first, retracted, position and a second, extended, position;
- a spring member for biasing the supporting portion away from the base portion in the movement direction from the first position to the second position;
- at least two hair-cutting units supported by the supporting portion and each comprising an external cutting member with hair-entry openings and an internal cutting member with a plurality of cutting elements which is rotatable relative to the external cutting member; and
- a respective drive spindle for each hair-cutting unit (13), wherein the shaver head further comprises:

a locking mechanism for selectively setting the supporting portion in a locked condition, wherein the supporting portion has a locked position in the movement direction relative to the base portion, or in an unlocked condition, wherein the supporting portion is enabled to move in the movement direction relative to the base portion.

The shaver head according to the invention has an elastic suspension arrangement by which the supporting portion, that supports the at least two hair-cutting units, is biased towards the skin during use. However, different users have different requirements, for example relating to their skin sensitivity. Thus, the bias provided by the spring member for the elastic suspension may not be comfortable for all users or it may absorb too much force for other users. According to the invention, the supporting portion, together with the at least two hair-cutting units supported thereby, can be set in a locked condition, wherein the supporting portion has a locked position relative to the base portion. In the locked condition, higher contact forces between the at least two hair-cutting units and the skin are not prevented by motion of the supporting portion towards the base portion against the biasing force of the spring member. This locked condition may be of interest for users with a less sensitive skin. The shaver head may for example comprise three hair-cutting units.

The ability to set the characteristics of the elastic suspension provides an improved user experience. It means that an optimal shave can be achieved for a wider variety of users. A typical user may keep the shaver head in the unlocked condition, whereas some other users are less susceptible to skin irritation and therefore they may use the shaver head in the locked condition, and thus be able to push harder during shaving, since they will not experience skin irritation effects. This may increase controllability by the user of the shaving process and the results thereof.

The locking mechanism for example comprises:

a shaft extending parallel to the movement direction and a collar arranged around the shaft for interaction with the shaft, wherein one of the shaft and the collar is mounted, in the movement direction, in a fixed position relative to the supporting portion and the other of the shaft and the collar is mounted, in the movement direction, in a fixed position relative to the base portion, wherein the shaft and the collar are rotatable relative to each other about an axis of rotation extending parallel to the movement direction, to set the locked condition or the unlocked condition of the supporting portion.

This provides a simple setting of the locked and unlocked conditions, by rotating a shaft or collar. The collar for example functions as a rotatable nut around the shaft, which functions as a spindle. The shaft is for example rotationally fixed. The relative rotational position of the shaft and the collar may change the relative positions of the shaft and the collar in the movement direction, so that movement of the supporting portion in the movement direction is either allowed or prevented.

The shaft for example has an external thread and the collar for example has an internal thread arranged for engagement with said external thread, wherein the external thread and the internal thread have a predefined mutual clearance in an axial direction parallel to the axis of rotation allowing movement of the shaft relative to the collar in the axial direction.

The locking is thus equivalent to tightening a nut, such that engaging threads block relative movement in the axial direction. The mutual clearance for example means that the space between adjacent windings of the internal thread is greater than the width of the external thread in the axial direction. This means that when the locking mechanism is not in a locked configuration, linear movement is possible in the axial direction, because the threads do not tightly mesh. Instead, one thread (e.g. the external thread) can axially move between a pair of adjacent threads (e.g. the internal threads).

In the first position of the supporting portion, movement of the supporting portion in the movement direction further towards the base portion may be prevented by mutual abutment of a first pair of abutment elements mounted in fixed positions relative to, respectively, the supporting portion and the base portion.

In the second position of the supporting portion, movement of the supporting portion in the movement direction further away from the base portion may be prevented by mutual abutment of a second pair of abutment elements mounted in fixed positions relative to, respectively, the supporting portion and the base portion.

These first and second positions are the end points of the movement of the supporting portion relative to the base portion. The movement of the supporting portion may thus be limited, in one direction, by the limit of the range of movement of the supporting portion defined by these abutment elements and, in the other direction, by abutment between the internal and external threads.

Thus, in this embodiment an external configuration of components may define the abutment elements which limit the movement of the supporting portion in one direction, and the thread engagement may limit movement in the other direction, thereby fixing a position of the supporting portion or setting a possible range of positions of the supporting portion.

The locking mechanism is for example configured to set the supporting portion in a first locked condition, wherein the supporting portion is locked in the first position relative to the base portion by mutual abutment of the abutment elements of the first pair and by mutual abutment of the internal thread and the external thread. This is the retracted position.

The locking mechanism may be configured to set the supporting portion in a second locked condition, wherein the supporting portion is locked in the second position relative to the base portion by mutual abutment of the abutment elements of the second pair and by mutual abutment of the internal thread and the external thread. This is the extended position.

The locking mechanism may be configured to set the supporting portion in a fully unlocked condition, wherein the supporting portion is enabled to move in the movement direction relative to the base portion over a maximum distance from the first position to the second position.

The locking mechanism may further be configured to set the supporting portion in a partially unlocked condition, wherein the supporting portion is enabled to move in the movement direction relative to the base portion over a limited distance from either the first position or the second position to an intermediate position between the first position and the second position which is defined by mutual abutment of the internal thread and the external thread.

It is preferably possible to select any one of these different locking conditions.

The shaft is preferably mounted in a fixed position relative to the supporting portion, and the collar is preferably mounted, in the movement direction, in a fixed position relative to the base portion and rotatable relative to the base portion about the axis of rotation.

The linear guiding structure for example comprises a guiding axle, mounted in a fixed position to the base portion and extending parallel to the movement direction, and a guiding bush mounted in a fixed position to the supporting portion, wherein the guiding bush is moveably guided along the guiding axle parallel to the movement direction, wherein the shaft is arranged in a fixed position relative to and circumferentially around the guiding bush, and wherein the collar is rotatable about the shaft and the guiding bush.

The locking mechanism is in this way integrated into the structure of the linear guiding structure. For example, the shaft and the guiding bush may be integrally formed such as by a single molded component.

In a first set of examples, the collar is rotatable by means of an electric motor.

In a second set of examples, the collar is rotatable by a manually actuatable operating member.

In a third set of examples, the collar is rotatable by a manually actuated slider.

There are thus various options for the control of the locking mechanism.

The base portion of the shaver head may include a coupling structure by means of which the shaver head is releasably couplable to the main housing of the electric shaver.

Each drive spindle for example comprises a coupling head for engagement with the internal cutting member of a respective one of the hair-cutting units, wherein the supporting portion is arranged centrally between the hair-cutting units, and wherein each hair-cutting unit is pivotable relative to the supporting portion about an axis extending tangentially relative to a central axis of the hair-cutting unit.

This provides a compact design.

The invention also provides an electric shaver comprising:

a main housing which accommodates an electric motor; and a shaver head as defined above coupled to the main housing.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
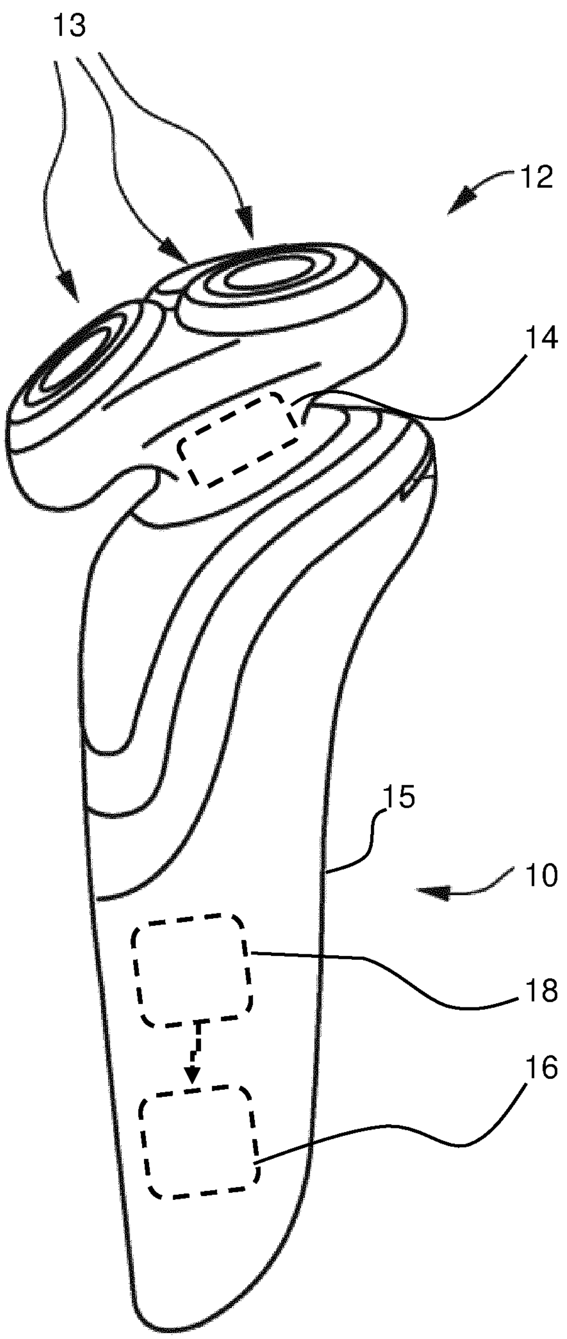
FIG. 1 shows a known electric shaver.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a shaver head for an electric shaver in which at least two hair-cutting units are supported by a supporting portion. The supporting portion is linearly movable under the bias of a spring member relatively to a base portion between a first, retracted, position and a second, extended, position. A locking mechanism is provided for selectively locking the supporting portion in a locked position relative to the base portion. This allows a user to select different shaving modes.

FIG. 1 shows a known electric shaver 10, comprising a shaver head 12 releasably connected to a main housing 15 via a connection interface 14. The shaver head has a set of three rotary hair-cutting units 13. A driving actuator 16 (i.e. a motor) is arranged in the main housing to enable driving of the rotary hair-cutting units 13. Other functional units may be connected to the main housing instead of the rotary shaver head. This invention relates in particular to the design of the shaver head. A controller 18 drives the shaver head.

The general functional operation of the shaver is well known and will not be described in detail in this application.

Figure 2:
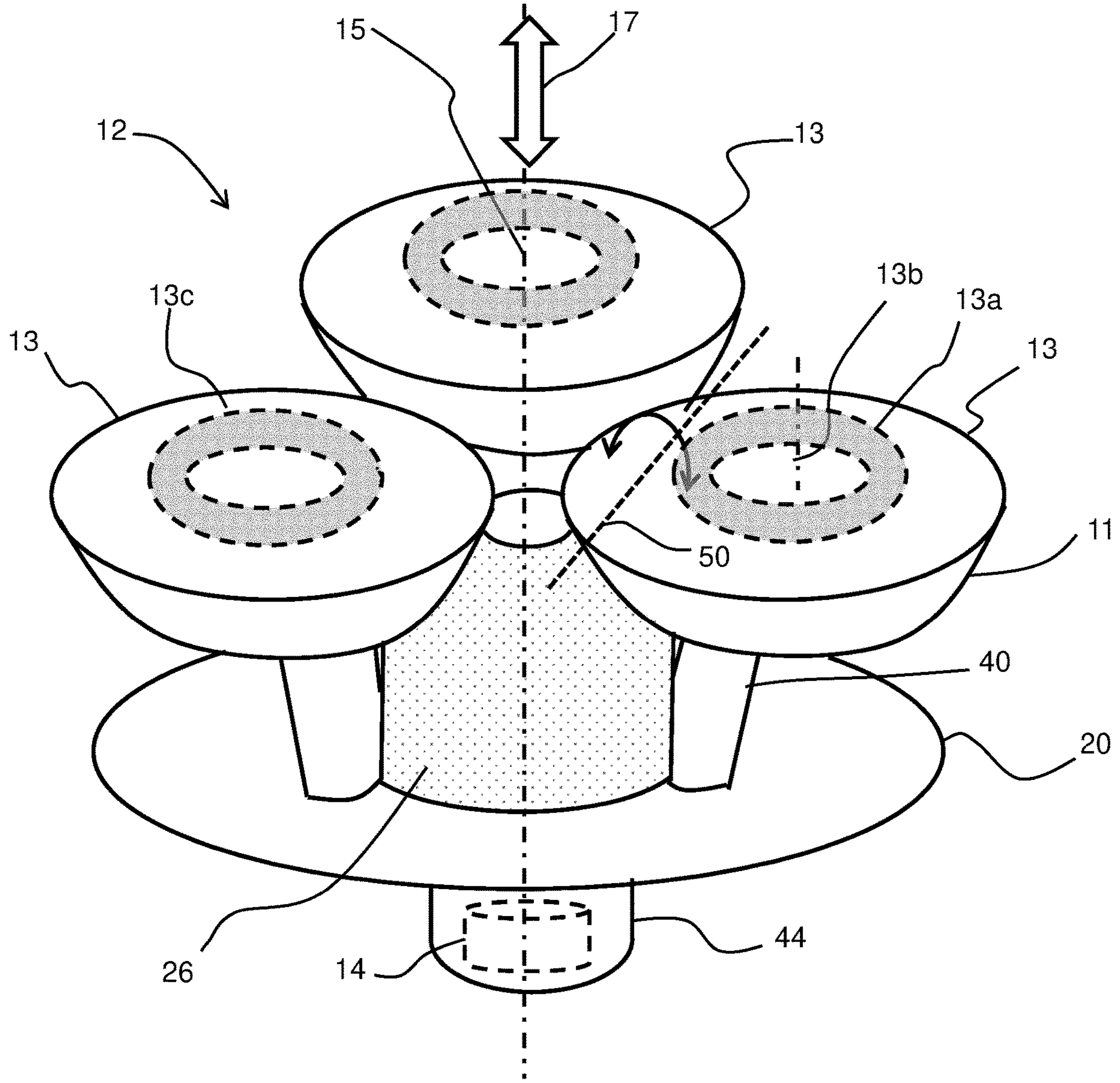
FIG. 2 shows one example of the type of shaver head to which the invention relates.

FIG. 2 shows one example of the type of shaver head to which the invention relates.

The shaver head 12 has a base portion 20 which includes a coupling structure 44 by means of which the shaver head is releasably couplable to the main housing 15 of the electric shaver 10.

In this example, the shaver head comprises three hair-cutting units 13, but alternatively the shaver head may comprise only two or more than three hair-cutting units. The hair-cutting units are of a rotary type. A supporting portion 26 is centrally arranged between the hair-cutting units 13 and has a central axis 15.

Each hair-cutting unit 13 is connected to the supporting portion 26 so that they form an assembly supported by the supporting portion 26. The supporting portion is biased outwardly relative to the base portion 20, i.e. away from the base portion 20 towards the skin.

Each individual hair-cutting unit 13 has an external cutting member 13*a* having a plurality of hair-entry openings. Within the external cutting member 13*a* is an internal cutting member (not shown) which is rotatable relative to the external cutting member. Together, they define a conventional rotary cutter.

The internal cutting members comprise a plurality of cutting elements each having a cutting edge. During rotation of the internal cutting member (with the external cutting member static), the cutting edges follow an annular cutting path about an axis of rotation 13*b* of the respective internal cutting member. The cutting path corresponds to the annular area over which the cutting edges move. The inner diameter of the cutting path thus corresponds to the diameter of the circular path followed by the radially innermost end point of the cutting edges (or of the radially innermost cutting edge in case the cutting edges have different radial positions), and the outer diameter of the cutting path thus corresponds to the diameter of the circular path followed by the radially outermost end point of the cutting edges (or of the radially outermost cutting edge in case the cutting edges have different radial positions).

In the example shown, each hair-cutting unit is also pivotable independently about a respective pivot axis 50 relative to the supporting portion 26. One such pivot axis is shown in FIG. 2. The pivot axis 50, as seen in an axial direction relative to the central axis 15 (i.e. looking down from the top of FIG. 2 along the central axis 15), is located between the central axis 15 and the annular cutting path 13*c*. Thus, each hair-cutting unit can rock inwardly and outwardly about a tangential axis close to the central axis. This enables a significant amount of change to the contour defined by the combination of the hair-cutting units. The supporting portion 26 implements the rotation axes for this pivoting movement.

In the example shown, each hair-cutting unit has its own housing 11 supporting the external and internal cutting members of the hair-cutting unit 13. This housing accommodates an individual hair-collecting chamber of the hair-cutting unit 13. Thus, there are separate hair-collecting chambers for each of the hair-cutting units 13.

The shaver head has a drive unit for driving the internal cutting members of the hair-cutting units 13 into rotation. The drive unit comprises, for each of the hair-cutting units, an individual drive spindle 40 which is rotationally supported by the base portion 20 and coupled to the internal cutting member of the respective hair-cutting unit 13. The hair-cutting units thus have independent drive spindles and the housings 11 are over these drive spindles. The drive spindles each have a head which projects into an opening in a bottom wall of the housing 11 and then into engagement with the rotational internal cutting members.

Each drive spindle 40 has two telescopic parts 40*a*, 40*b* (shown in FIG. 5) which are spring loaded so that each hair-cutting unit is independently biased outwardly as well as the overall assembly being outwardly biased by the supporting member 26. The drive spindles 40 also urge the hair-cutting units into a pivoted end position about their respective rotation axes 50 in which the outer portion of their periphery rim is outwardly raised relative to the inner portion of their periphery.

The drive unit is releasably couplable to the driving actuator 16 (motor) in the main housing 15 of the shaving device by means of a single driven coupling member 14 which is accommodated in the coupling structure 44 shown in FIG. 2. The base portion 20 comprises a transmission unit (not shown) for coupling the single driven coupling member 14 to each of the individual drive spindles 40. This transmission unit comprises an arrangement of cogs. Thus, although individual drive spindles 40 are used, a single driven coupling member 14 is used, and a transmission unit provides a coupling of the single driven coupling member 14 to the individual drive spindles 40.

The supporting portion 26 is mounted to the base portion 20 by a linear guiding structure which enables the supporting portion 26 to linearly move relative to the base portion 20 in a movement direction parallel to the central axis 15, as shown by arrow 17. The linear motion of the supporting portion 26 is possible between a first, retracted, position and a second, extended, position relative to the base portion 20. The supporting portion 26 is biased by a spring member 30 which biases the supporting portion 26 away from the base portion 20 in the movement direction 17 from the first position to the second position.

This shaver head provides a supporting portion to which the hair-cutting units are connected, so that the hair-cutting units may be biased by the supporting member as a combined assembly. A linear guiding structure implements the movement of the supporting portion relative to the base portion. In addition to the movement of the combined assembly, as described here before, each hair-cutting unit has independent pivoting about a pivot axis relative to the supporting portion, so that the assembly of hair-cutting units can adapt to the contours of the user's face. In this way, a comfortable and close shave can be achieved.

In the example shown, the linear guiding structure comprises a guiding axle and a guiding bush moveably guided along the guiding axle, discussed in greater detail below.

The invention provides a locking mechanism for locking the elastic suspension system. In particular, the locking mechanism is configured for selectively setting the supporting portion 26 in a locked condition, wherein the supporting portion has a locked position in the movement direction 17 relative to the base portion 20, or in an unlocked condition, wherein the supporting portion 26 is enabled to move in the movement direction 27 relative to the base portion 20.

One example of the locking mechanism comprises a shaft and a collar arranged around the shaft for interaction with the shaft, wherein one of the shaft and the collar extends from the supporting portion 26 and the other of the shaft and the collar extends from the base portion 20.

Figure 3:
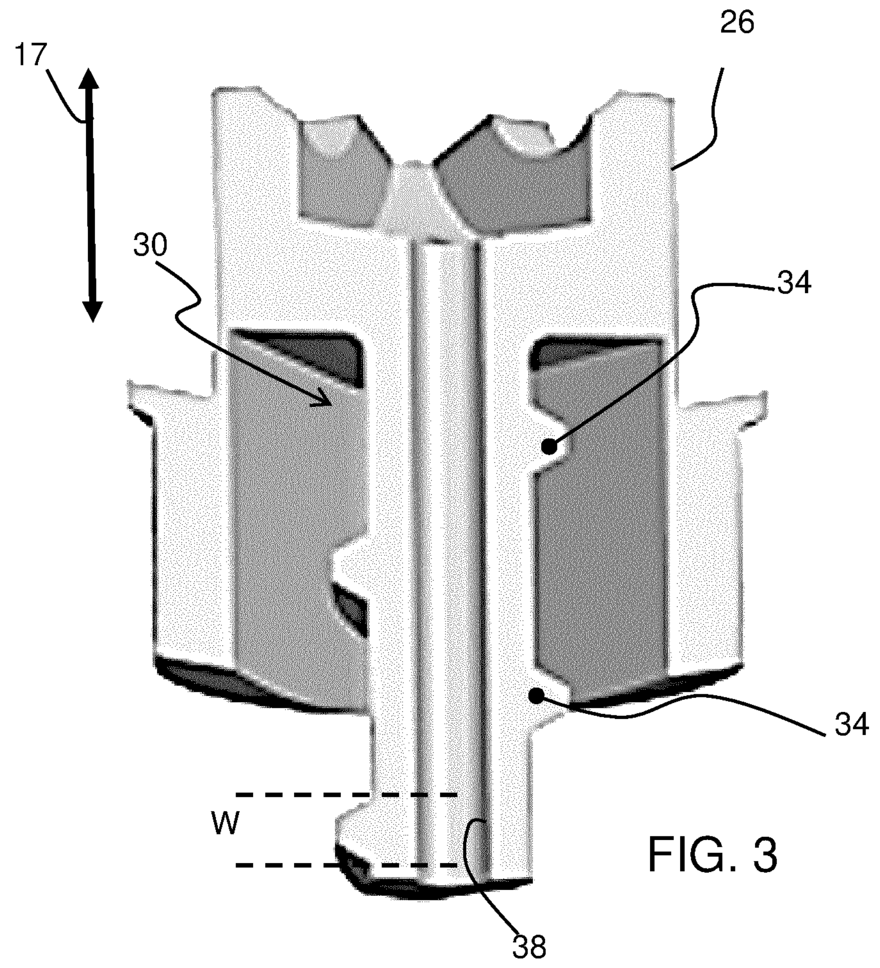
FIG. 3 shows the shaft of the locking arrangement.
Figure 4:
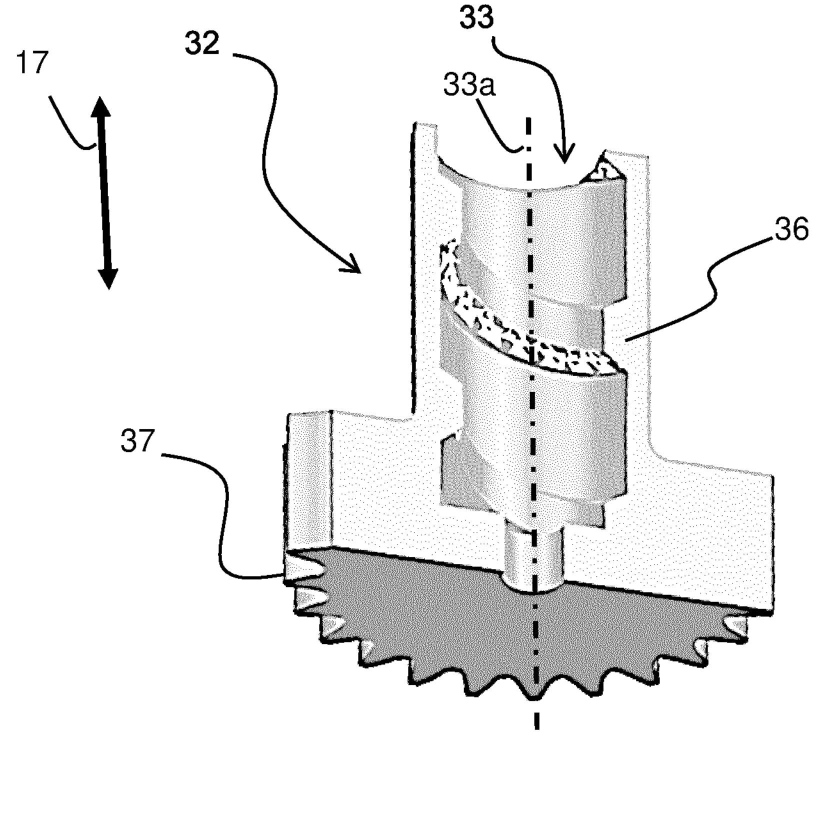
FIG. 4 shows the collar of the locking arrangement.

FIG. 3 shows the shaft 30 and FIG. 4 shows the collar 32. The shaft 30 extends parallel to the movement direction 17 and is mounted, in the movement direction, in a fixed position relative to the supporting portion 26 and has an external thread 34 along its length. The shaft 30 has an internal bore 38 which functions as the guiding bush mentioned here before. The thread 34 is helical, but the space between adjacent pitches of the thread 34 is much greater than the width W of the thread 34 in the axial direction.

The collar 32 is mounted, in the movement direction 17, in a fixed position relative to the base portion 20 and has an internal thread 36 in a bore 33. The space between adjacent pitches of the thread 36 is much larger than the width of the thread in the axial direction. The collar 32 is able to rotate relative to the base portion 20 and relative to the shaft 30 about an axis of rotation 33*a* extending parallel to the movement direction 17 to set the locked condition or the unlocked condition of the supporting portion 26, as described in detail hereafter. The shaft 30 is able to slide axially but does not rotate. The collar has a drive cog 37 for rotational control of the collar. Of course, other configurations are possible, for example with the shaft mounted to the base portion and rotating and with the collar mounted to the supporting portion and axially translating.

The shaft 30 is accommodated into the bore 33 of the collar 32, so that the external thread 34 of the shaft 30 engages with the internal thread 36 of the collar 32. However, the large pitches of the internal and external threads 34, 36 imply that the internal and external threads 34, 36 have a predefined mutual clearance in the axial direction parallel to the axis of rotation 33*a*, so that the two parts do not interlock axially. Instead, the shaft 30 is allowed to move relative to the collar 32 in the axial direction within the bore 33, while the external thread 34 of the shaft 30 moves between adjacent opposing internal threads 36 of the collar 32. The maximum range of movement corresponds to the pitch (less the width of the thread). Thus, movement along the axis of rotation 33*a* is limited by engagement between the external and internal threads of the shaft 30 and the collar 32.

The locked condition of the supporting portion 26 may be achieved both in the first, retracted, position and in the second, extended position of the supporting portion 26 relative to the base portion 20. In either of these positions the supporting portion 26 has reached a stop, so that the supporting portion 26 cannot move in one direction any further as a result of external features. These external features (i.e. external to the collar 32) comprise a first pair of abutment elements (66*a* and 66*b* in FIG. 5) which prevent movement of the supporting portion 26 further towards the base portion 20 in the first, retracted position of the supporting portion 26, and a second pair of abutment elements (67*a* and 67*b* in FIGS. 7 and 9) which prevent movement of the supporting portion 26 in the movement direction further away from the base portion 20 in the second, extended position of the supporting portion 26.

The first pair comprises a downwardly facing abutment surface 66*a* provided on a first hook-shaped element mounted in a fixed position to the supporting portion 26 and an upwardly facing abutment surface 66*b* provided in a fixed position on the base portion 20. The second pair comprises an upwardly facing abutment surface 67*b* provided on the hook-shaped element and a downwardly facing abutment surface 67*a* provided on a second hook-shaped element mounted in a fixed position on the base portion 20.

In each of these two locked conditions, abutment of the external and internal threads 34, 36 of the shaft 30 and the collar 32 then blocks the movement of the supporting portion 26 in the respective direction opposite to said one direction, as will be described in detail here after.

This provides a simple adjustment approach, by rotating the collar (in this particular example). The collar for example functions as a rotatable nut around the shaft, which functions as a spindle.

The locking mechanism is configured to set the supporting portion 26 in:

- a first locked condition, wherein the supporting portion is locked in the first, lowest or retracted, position relative to the base portion by mutual abutment of the abutment elements of the first pair and by mutual abutment of the internal thread and the external thread;
- a second locked condition, wherein the supporting portion is locked in the second, highest or extended, position relative to the base portion by mutual abutment of the abutment elements of the second pair and by mutual abutment of the internal thread and the external thread;
- a fully unlocked condition, wherein the supporting portion is enabled to move in the movement direction relative to the base portion over a maximum distance from the first position to the second position; and
- a partially unlocked condition, wherein the supporting portion is enabled to move in the movement direction relative to the base portion over a limited distance from either the first position or the second position to an intermediate position between the first position and the second position which is defined by mutual abutment of the internal thread and the external thread.

The locking mechanism has at least a fully unlocked positon and one of the two locked positions.

The first locked position, which is the fully retracted position, gives a higher spring pushing force resulting from the compression of the springs in the drive spindles 40. This reduces the risk of hair pulling resulting from undesired jumping of the internal cutting member relative to the external cutting member, and increases the pivoting stiffness of the hair-cutting units 13 about the pivot axes 50.

The second locked position, which is the fully extended position, gives a lower spring pushing force resulting from the compression of the springs in the drive spindles 40. This reduces wear of the internal and external cutting members of the hair-cutting units 13 and decreases the pivoting stiffness of the hair-cutting units 13 about the pivot axes 50.

Figure 5:
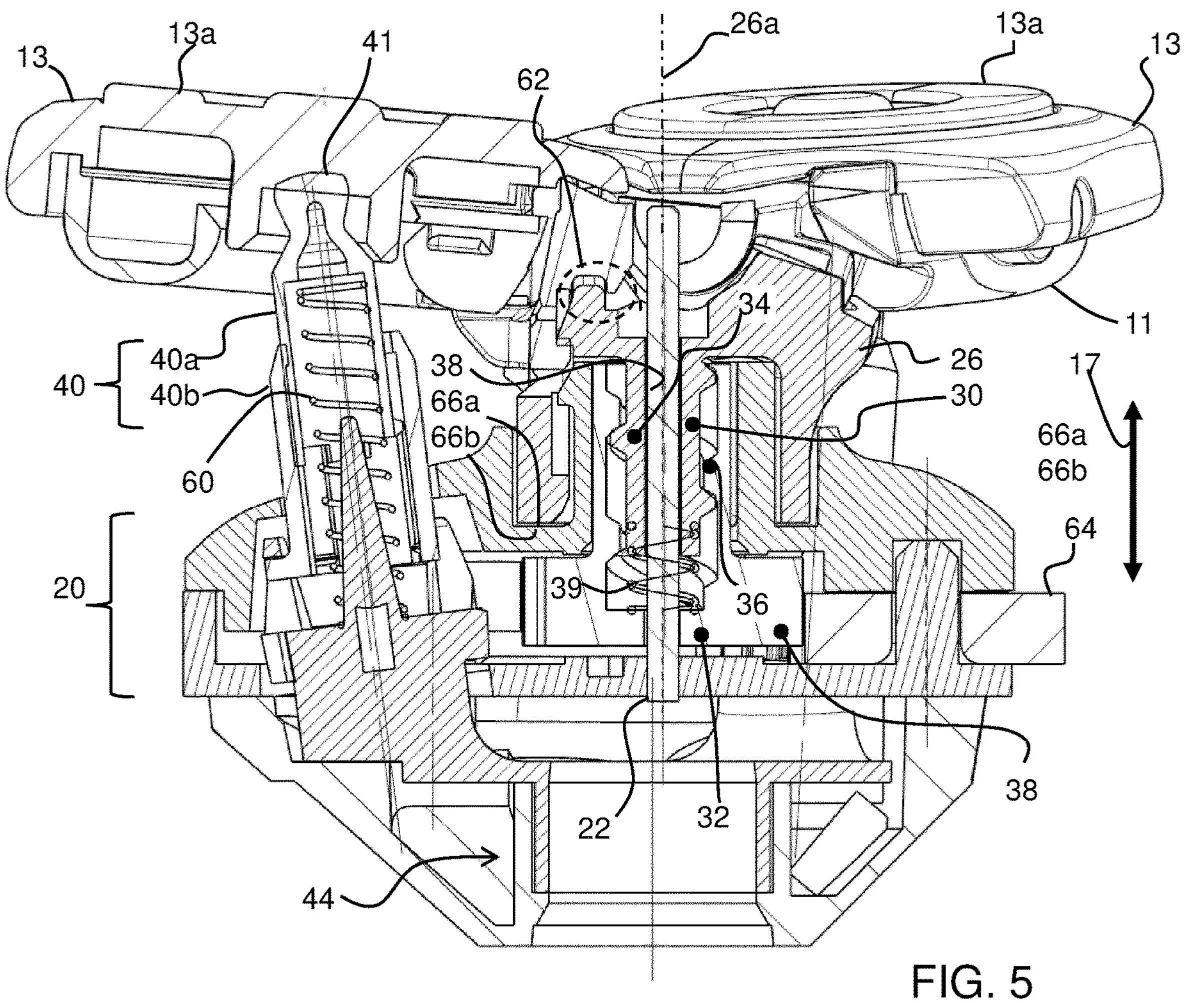
FIG. 5 shows one detailed example of the shaver head in cross section, with the locking mechanism locked in the retracted position of the supporting portion.

FIG. 5 shows one detailed example of the shaver head in cross section. It shows the locking mechanism in the first locked condition with the supporting portion 26 in the first, retracted, position.

FIG. 5 also shows the telescopic design of the drive spindles 40, having concentric inner and outer sleeves 40*a*, 40*b* and each having an internal spring 60, and also shows the spring member 39 for biasing the supporting portion 26 away from the base portion 20 in the movement direction.

The spindle 40 comprises a driving head 41 for engagement with the internal cutting member of a respective one of the rotary hair-cutting units 13. Region 62 shows that the supporting portion 26 engages with a radially inner part of each rotary hair-cutting unit 13. This engagement defines the pivot axis 50 of the hair-cutting unit. The spring 60 of each drive spindle 40 biases each hair-cutting unit into a default position (as shown). This bias urges the radially outer portion of the hair-cutting unit upwardly, because the pivot axis is between the drive spindle 40 and the central axis 26*a* of the supporting portion 26.

FIG. 5 also shows the guiding axle 22 of the linear guiding structure, mounted in a fixed position to the base portion 22 and extending parallel to the movement direction 17. FIG. 5 further shows the guiding bush 38 of the linear guiding structure, which is integrally formed with the shaft 30 and, thus, mounted in a fixed position to the supporting portion 26. The shaft 30 is arranged circumferentially around the guiding bush 38. The collar 32 is rotatable about the shaft 30 and the guiding bush 38. The guiding bush 38 is moveably guided along the guiding axle 22 parallel to the movement direction 17.

In this example, there is a mechanical drive cog 64 which can be manually operated by a user. The drive cog 64 meshes with a further drive cog 38 which is mounted around the collar 32. FIG. 5 shows that the locking mechanism is integrated into the structure of the linear guiding structure.

The shaft 30 with its external thread 34 and the guiding bush 38 are a single molded component.

In the first locked condition of the supporting portion 26 as shown in FIG. 5, the supporting portion 26 has reached its first, retracted, position relative to the base portion 20, i.e. the lower limit of its possible range of linear movement. As discussed here before, this lower limit is defined by the mutual abutment of the first pair of abutment elements 66*a*, 66*b*. In this first locked condition, upward movement of the shaft 30 and the supporting portion 26 away from the base portion 20 is prevented by the mutual abutment of the external and internal threads 34, 36 of the shaft 30 and the collar 32. For this purpose, the collar 32 is rotated to its maximum position in a first one of its two rotational directions, such that it has pushed the shaft 30 and the supporting portion 26 downwardly until they reach the lowest position, i.e. the first, retracted, position.

Figure 6:
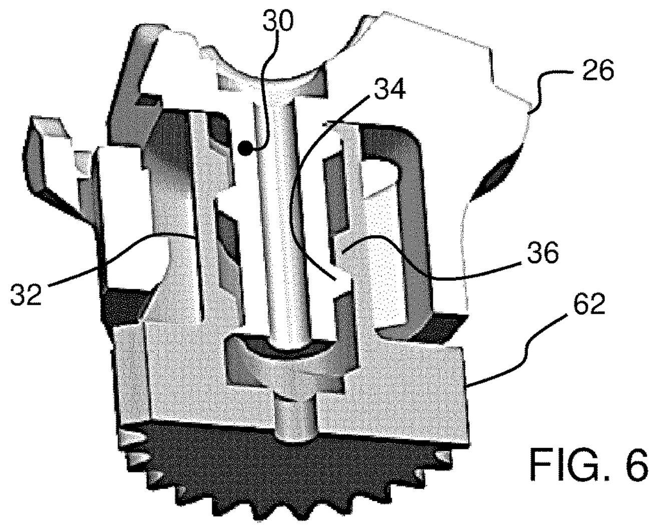
FIG. 6 shows the relative positions of the shaft and collar in the locked retracted position of the supporting portion.

FIG. 6 shows the relative positions of the shaft 30 and the collar 32 in the first locked condition of the supporting portion 26 as shown in FIG. 5.

Figure 7:
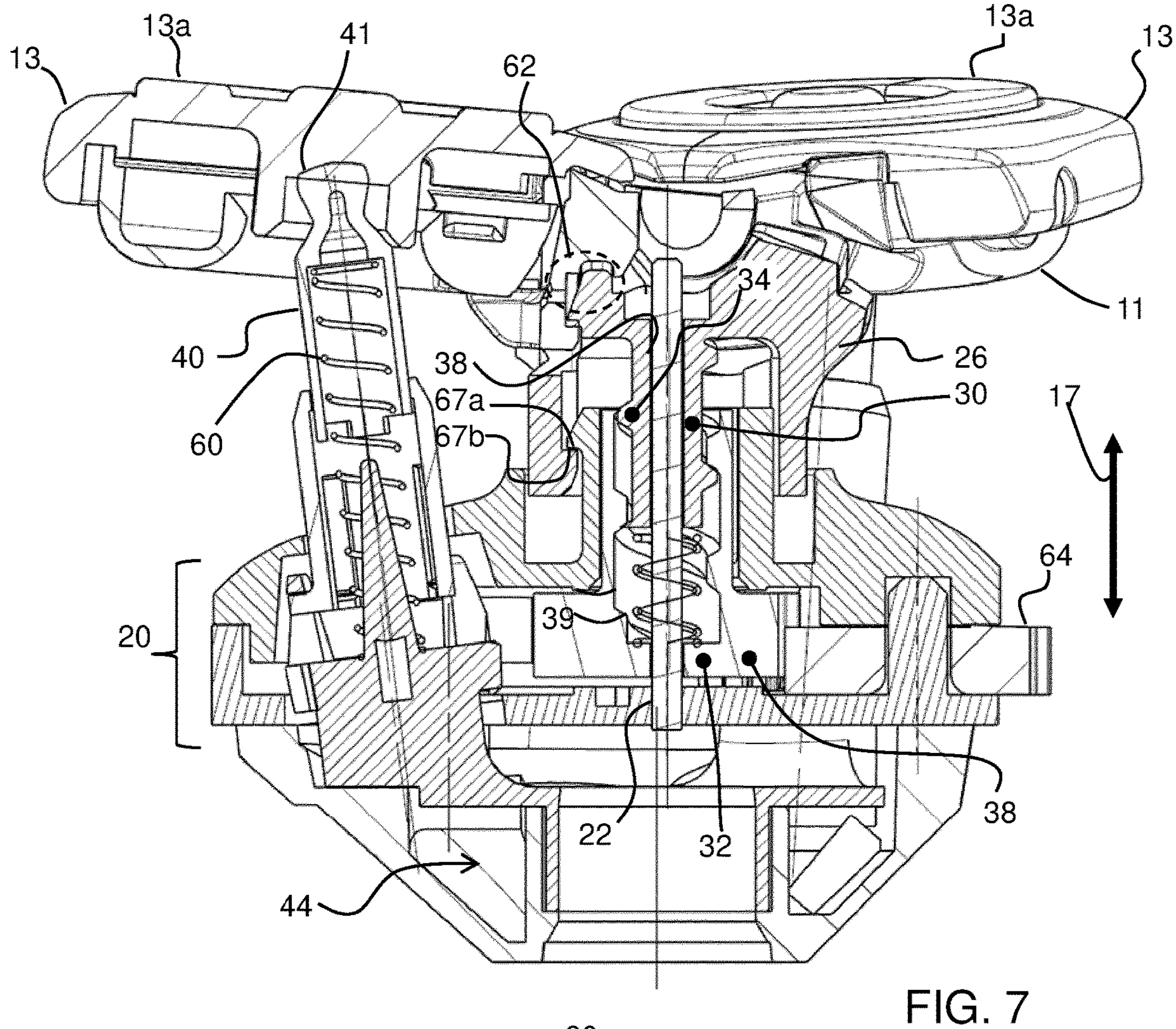
FIG. 7 shows the shaver head of FIG. 5 in an unlocked condition in which the supporting portion is free to move up and down.

FIG. 7 shows the shaver head of FIG. 5 in the fully unlocked condition of the supporting portion 26, in which the supporting portion 26 is enabled to move up and down in the movement direction 17 over a maximum distance from the first, retracted, position to the second, extended position. FIG. 7 shows the supporting portion 26 in the second, extended, position, which is defined by the mutual abutment of the second pair of abutment elements 67*a*, 67*b*. The supporting portion 26 is pushed up into the extended position by the spring member 39, but can be pushed down towards the base portion 20 against the spring bias of the spring member 39 until the second, retracted, position, for example when the user pushes the shaver against the face. This is the fully unlocked condition of the supporting portion 26, wherein the assembly of hair-cutting units is at the fully extended position, but is free to fully retract until the second, retracted, position.

Figure 8:
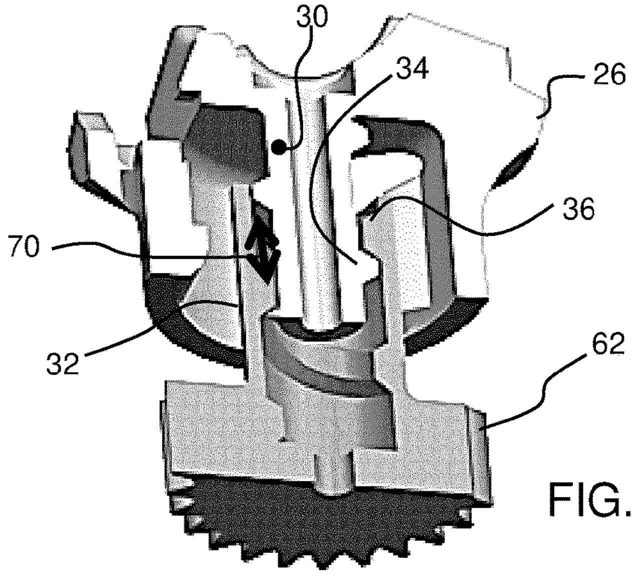
FIG. 8 shows the relative positions of the shaft and collar in the unlocked condition of the supporting portion.

FIG. 8 shows the relative positions of the shaft 30 and the collar 32 in the fully unlocked condition of the supporting portion 26 as shown in FIG. 7. In this figure, the possible range of movement is shown by arrow 70 and is defined by the mutual clearance between the external and internal threads 34, 36 of the shaft 30 and the collar 32. The external thread 34 can slide between positions at which it abuts the internal thread 36 on adjacent sides. In the fully unlocked condition, the collar is rotated to a middle position between its maximum position in the first one of its two rotational directions, as shown in FIG. 6, and a maximum position in a second one of its two rotational directions, so that the supporting member 26 may be fully moved between the first, retracted, position and the second, extended, position as a result of the clearance between the threads 34, 36 of the shaft 30 and the collar 32.

Figure 9:
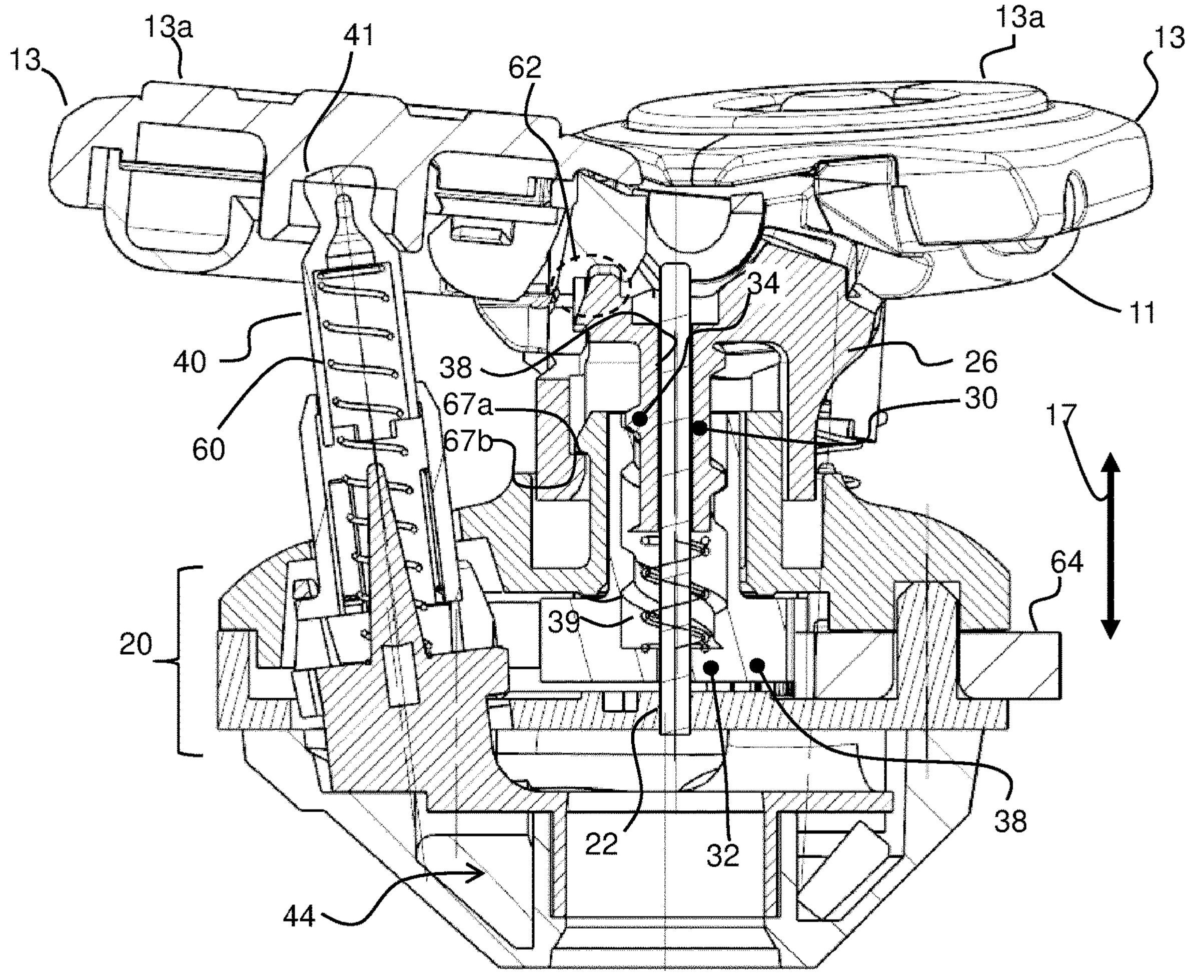
FIG. 9 shows the shaver head of FIG. 5 with the locking mechanism locked in the extended position of the supporting portion.

FIG. 9 shows the shaver head of FIGS. 5 and 7 in the second locked condition of the supporting portion 26. In this second locked condition, the supporting portion 26 has reached its second, extended, position relative to the base portion 20, the upper limit of its possible range of linear movement. As discussed here before, this upper limit is defined by the mutual abutment of the second pair of abutment elements 67*a*, 67*b*. In this second locked condition, downward movement of the shaft 30 and the supporting portion 26 towards the base portion 20 is prevented by the mutual abutment of the external and internal threads 34, 36 of the shaft 30 and the collar 32. For this purpose, the collar 32 is rotated to its maximum position in the second one of its two opposite rotational directions such that it has pushed the shaft 30 and the supporting portion 26 upwardly until they reach the highest position, i.e. the second, extended, position.

Figure 10:
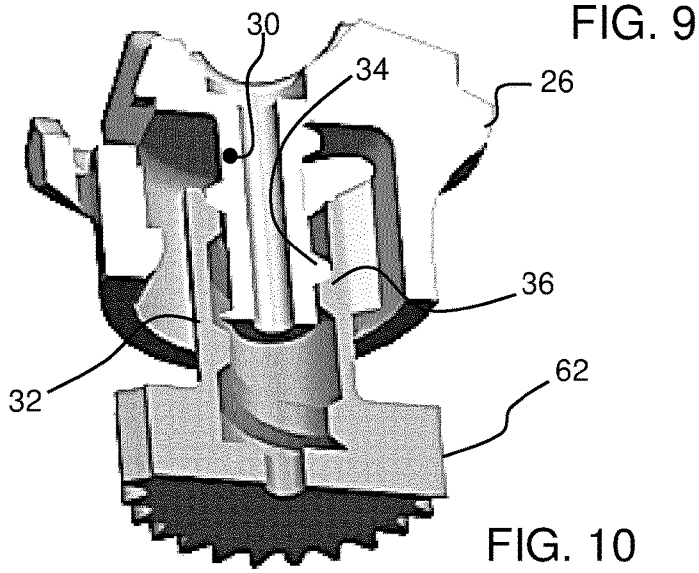
FIG. 10 shows the relative positions of the shaft and collar in the locked extended position of the supporting portion.

FIG. 10 shows the relative positions of the shaft 30 and the collar 32 in the second locked condition of the supporting portion 26 as shown in FIG. 9.

Based on the description here before of the first and second locked conditions and the fully unlocked condition of the supporting portion 26 with reference to FIGS. 5 to 10, it will be clear for the person skilled in the art that the collar 32 may also be rotated into any intermediate position between its maximum position in the first one of its two opposite rotational directions (as shown in FIG. 6) and its middle position (as shown in FIG. 8). In such an intermediate position of the collar 32, the locking mechanism sets the supporting portion 26 in a partially unlocked condition, wherein the supporting portion 26 is enabled to move in the movement direction 17 relative to the base member 20 over a limited distance from the first, retracted, position to an intermediate position between the first, retracted, position and the second, extended, position, wherein said intermediate position is defined by the mutual abutment of the external and internal threads 34, 36 of the shaft 30 and the collar 32. Furthermore, the collar 32 may also be rotated into any intermediate position between its maximum position in the second one of its two opposite rotational directions (as shown in FIG. 10) and its middle position (as shown in FIG. 8). In such an intermediate position of the collar 32, the locking mechanism sets the supporting portion 26 in a partially unlocked condition, wherein the supporting portion 26 is enabled to move in the movement direction 17 relative to the base member 20 over a limited distance from the second, extended, position to an intermediate position between the first, retracted, position and the second, extended, position, wherein said intermediate position is defined by the mutual abutment of the external and internal threads 34, 36 of the shaft 30 and the collar 32.

These settings of the locking mechanism thus cater for different users with different requirements, for example relating to their skin sensitivity. The ability to set the characteristics of the elastic suspension provides an improved user experience. It means that an optimal shave can be achieved for a wider variety of users. A typical user may keep the system in an unlocked mode, whereas some other users are less susceptible to skin irritation and therefore they may use a locked mode, and thus be able to push harder during shaving, since they will not experience skin irritation effects.

There are various ways to implement the rotary adjustment of the collar 30.

FIGS. 5 to 10 show an externally protruding cog 64 for manual rotation by the user, as explained here before.

Figure 11:
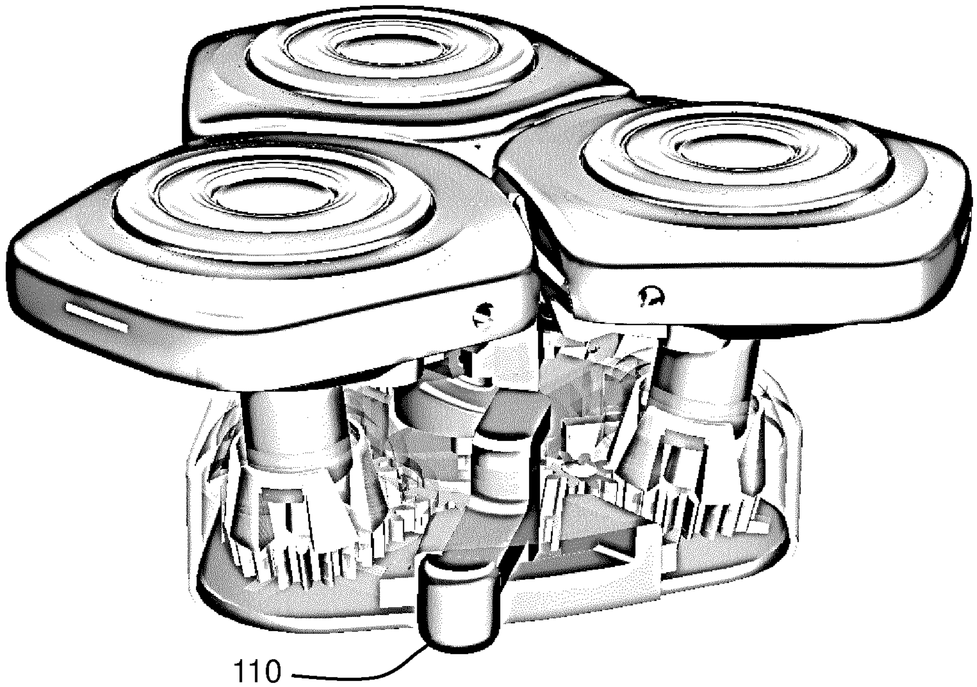
FIG. 11 shows an external manual lever.

FIG. 11 shows an external manual lever 110. It may for example be used to rotate the drive cog 64, which is then fully internal to the base portion 20.

Figure 12:
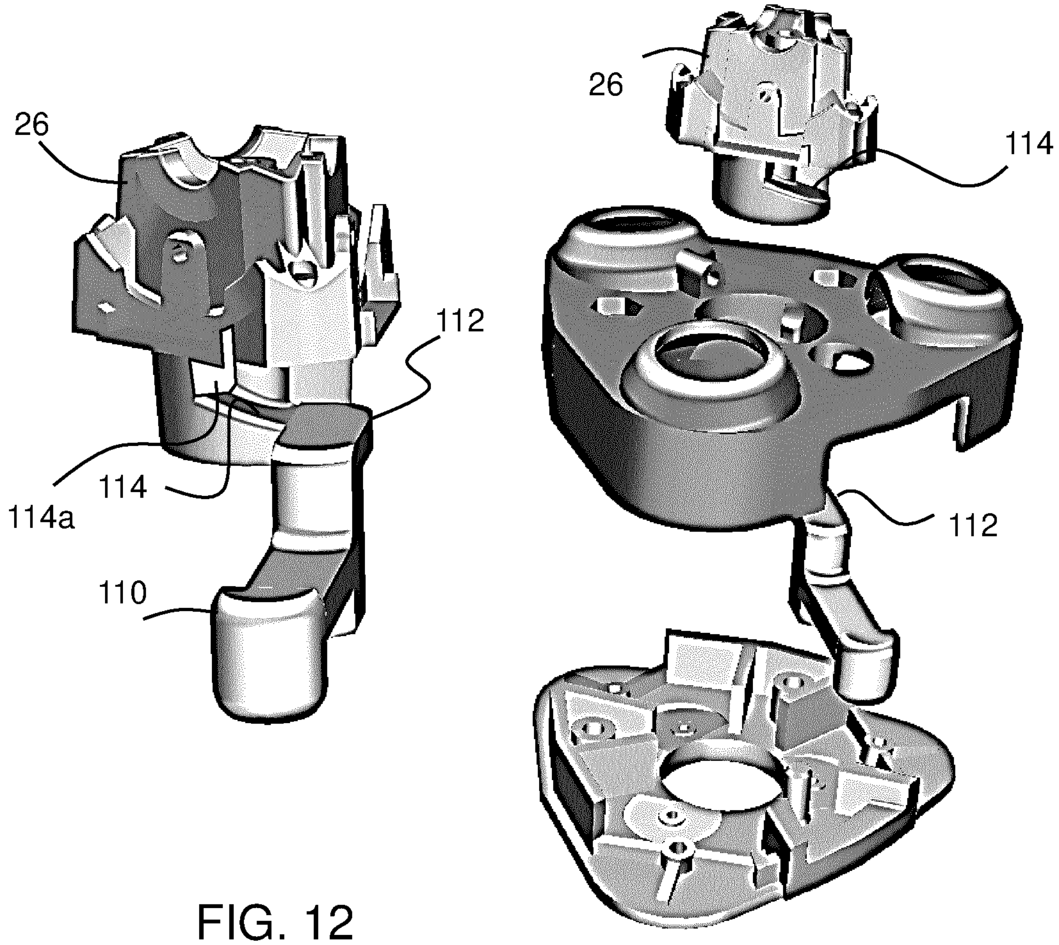
FIG. 12 shows another implementation of a locking mechanism having an external manual lever.

However, FIG. 12 shows that the rotatable manual lever 110 may instead directly actuate the locking mechanism.

For example the range of movement of the supporting portion 26 may be limited by interaction of a tab 112, at an end of the lever 110, with an inclined guiding surface 114 provided on the supporting portion 26. This is an alternative to the shaft and collar design above.

In this example, the supporting portion 26 may have a full range of movement when the tab 112 is in one position as shown in FIG. 12. This range is progressively narrowed as the tab 112 is rotated along the inclined guiding surface 114. This rotation will push down the supporting portion 26 towards the base portion 20 and, thus, will limit the allowed uppermost position of the supporting portion 26 relative to the base portion. At the inner end 114*a* of the inclined guiding surface 114, which defines the limit of rotation of the lever 110, the supporting portion 26 is locked in its second, retracted, position. Thus, the range of movement of the supporting portion 26 is defined by the rotational position of the lever 110 in that the supporting portion 26 can only move upwardly until the inclined guiding surface 114 abuts the tab 112.

Figure 13:
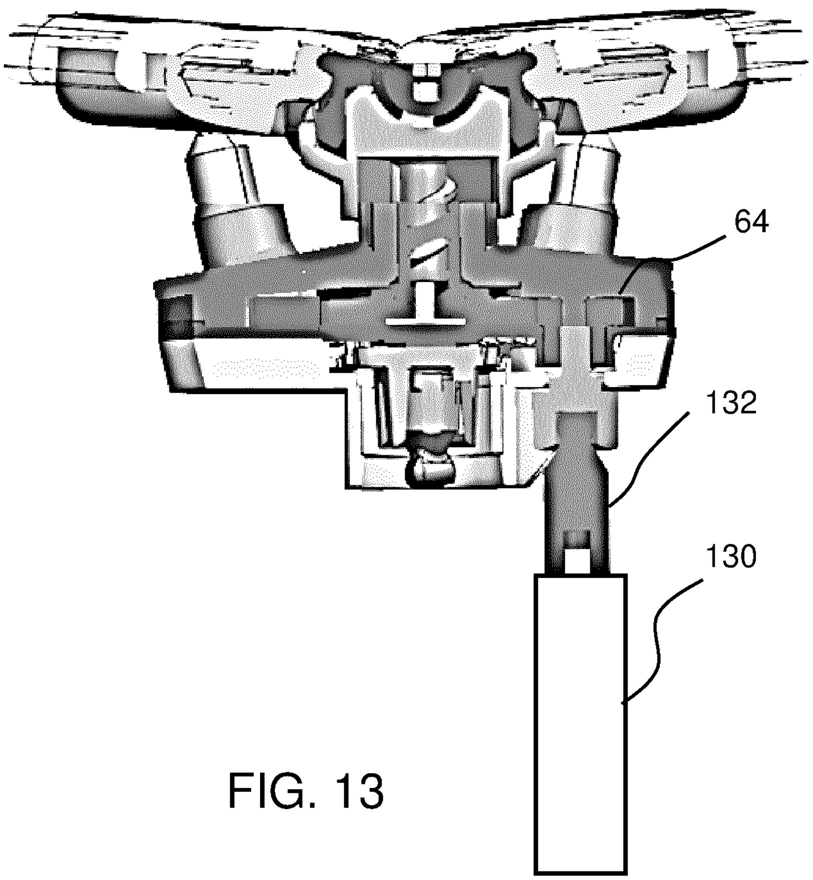
FIG. 13 shows an implementation using a motor for controlling the locking mechanism.

Instead of a manually actuatable operating member, the locking mechanism may be actuated by means of an electric motor or other type of actuator arranged in the shaver head or in the main housing of the electric shaver. FIG. 13 shows a gearbox 130 for speed reduction. An output shaft 132 drives the drive cog 64. The gearbox 130 is internal to the main housing 15 and driven by an electric motor.

Figure 14:
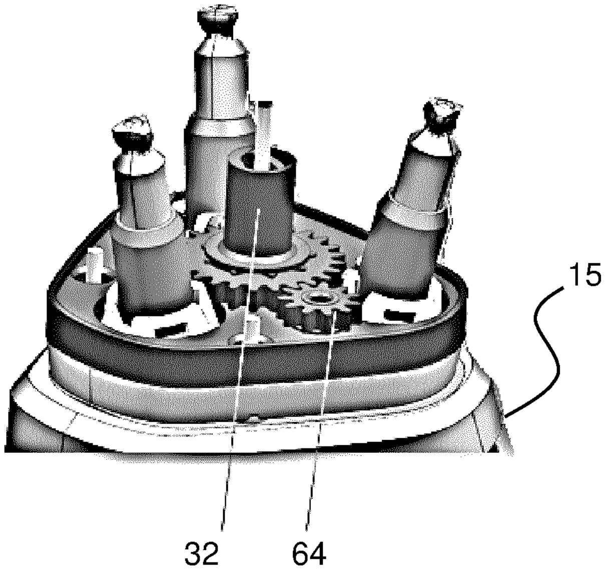
FIG. 14 shows the implementation of FIG. 13 with the hair-cutting units removed to show the rotating parts of the locking mechanism more clearly.

FIG. 14 shows the design of FIG. 13 with the hair-cutting units removed to show the rotating parts, i.e. the drive cog 64 and the collar 32, more clearly.

Figure 15:
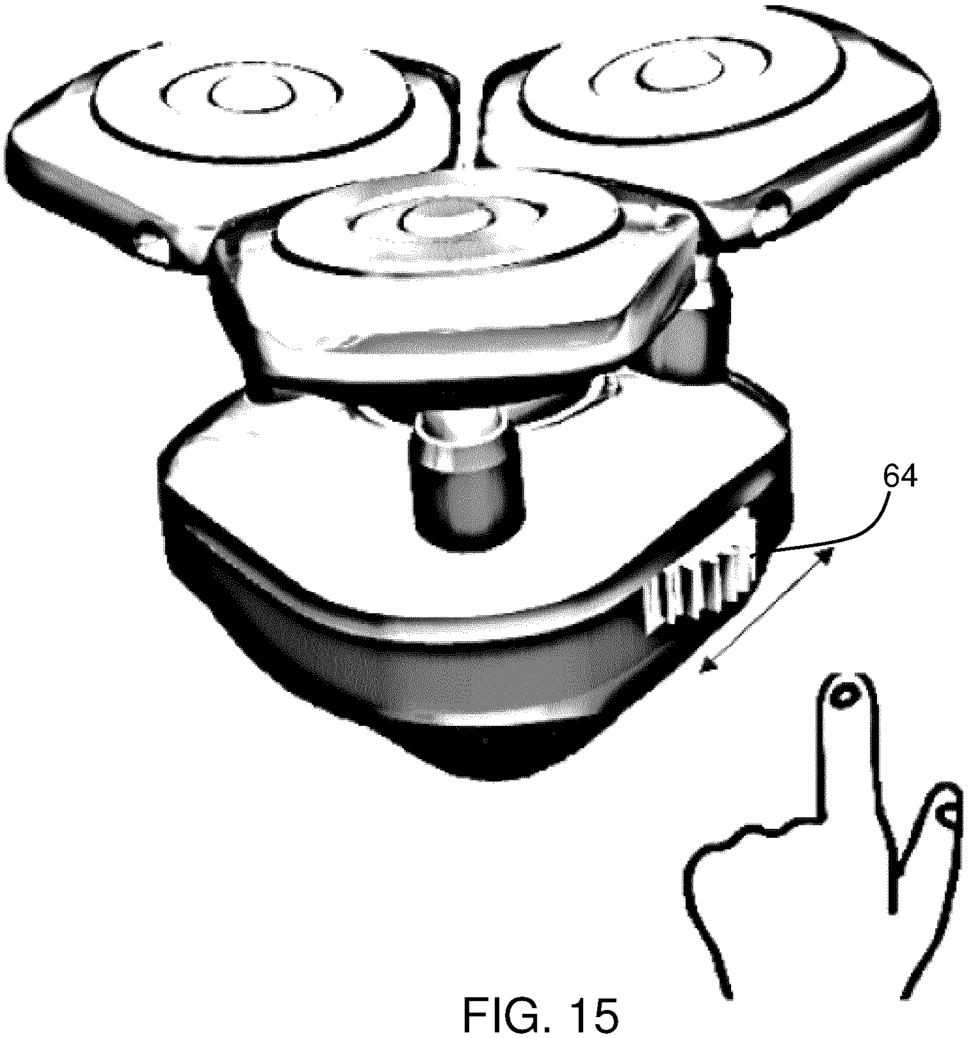
FIG. 15 shows a perspective view of the design of FIGS. 5 to 10.
Figure 16:
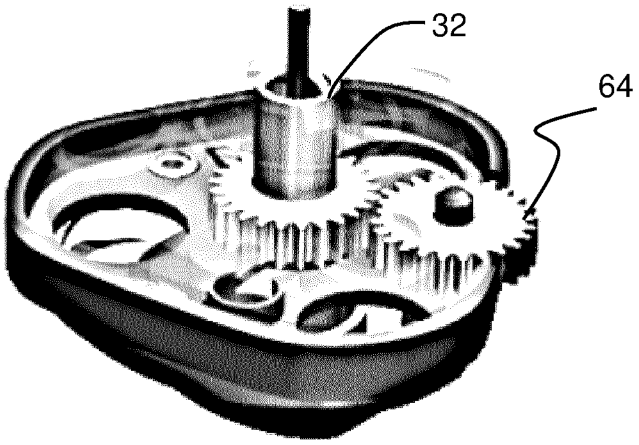
FIG. 16 shows the design of FIG. 15 with the hair-cutting units removed to show the rotating parts of the locking mechanism more clearly.

FIG. 15 shows a perspective view of the design of FIGS. 5 to 10 and FIG. 16 shows the design of FIG. 15 with the hair-cutting units removed to show the rotating parts, i.e. the cog 64 and the collar 32 more clearly.

Figure 17:
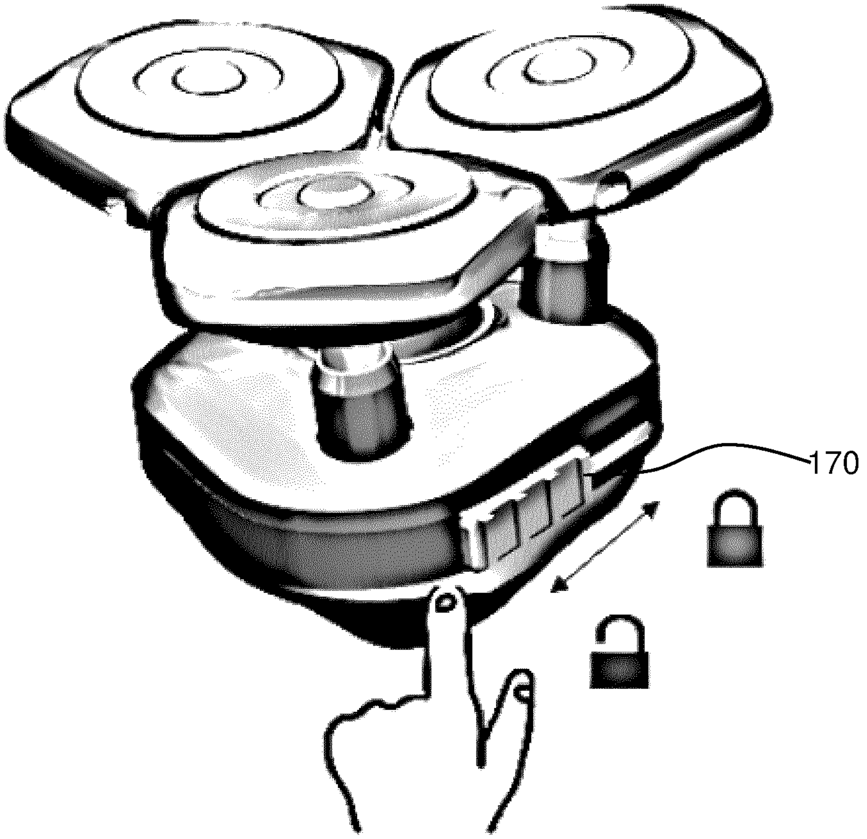
FIG. 17 shows a perspective view of a modification to the design of FIGS. 5 to 10 in which a slider is used to control the locking mechanism.
Figure 18:
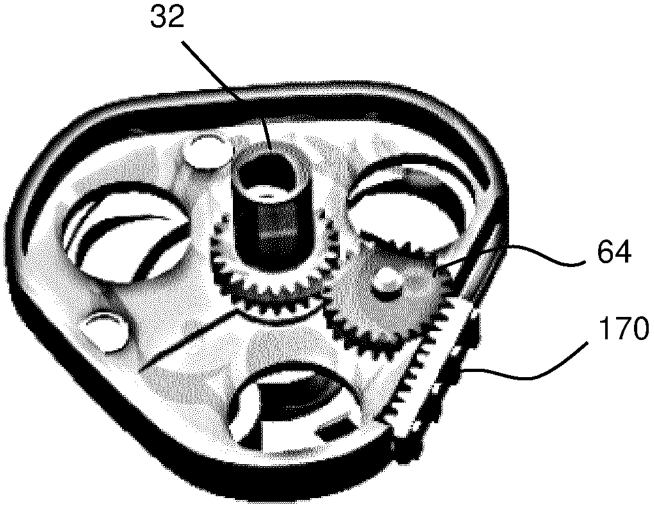
FIG. 18 shows the arrangement of FIG. 17 with the hair-cutting units removed.

FIG. 17 shows a perspective view of a modification to the design of FIGS. 5 to 10 in which a manually operable slider 170 is used. The slider has a linear cog face which engages with the driver cog 64. This can be seen more clearly in FIG. 18 which shows the design of FIG. 17 with the hair-cutting units removed to show the rotating parts, i.e. the cog 64 and the collar 32 more clearly.

The examples above provide manual control of the setting of the locking mechanism of the elastic suspension or control using an electric motor or other type of electric actuator.

The electric motor or actuator may be used simply in response to a user command provided to a user interface of the shaver. For example, selection buttons may be provided on the main housing of the shaver or there may be control from a remote device (such as a mobile phone with an app) by wireless communication.

However, an alternative is to control the elastics suspension during shaving using feedback relating to the shaving performance in use.

One possible cost effective feedback loop mechanism may be based on electrical actuation with a motor gearbox (e.g. 130 in FIG. 13) which is drivable between two mechanical end stops. Feedback may then be based on a motor current monitoring system. If the motor is running clockwise and the motor current exceeds a maximum threshold value for more than a threshold time (e.g. 0.5 sec). the mechanical end stop is reached. If the motor is running counterclockwise, again a certain current threshold value can be detected.

The driving to these end stops may be based on shaving performance related pre-settings.

The condition which has been set (either manually or electrically) may be provided to the user as output information for example using an output interface such as a display or arrangement of LEDs. This may be detected based on a mechanical or optical encoder. Instead, a motor drive algorithm may be based on performing pulse counting between modes and a "homing" algorithm is then used to match the mechanical "zero" and the electrical "zero". This homing may comprise running the motor and gearbox combination until a mechanical end stop. Once a stall current of the motor is reached, the encoder is no longer reading pulses. This sets a reference. Thus, feedback is not required, and the motor drive is used to derive the position information.

The shaver head for example has a default setting, which is a setting allowing the full range of movement of the supporting portion and with the spring member biasing the assembly of hair-cutting units to the extended position (i.e. the fully unlocked condition). The user then overrides this setting if he desires so.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A shaver head for an electric shaver comprising:
- a base portion for connection of the shaver head to a main housing of the electric shaver;
- a supporting portion mounted to the base portion;
- a linear guiding structure for enabling the supporting portion to linearly move in a movement direction relative to the base portion between a retracted first position and an extended second position;
- a spring member for biasing the supporting portion away from the base portion in the movement direction from the first position to the second position;
- at least two hair-cutting units supported by the supporting portion, wherein each hair-cutting unit comprises an external cutting member with hair-entry openings and an internal cutting member with a plurality of cutting elements rotatable relative to the external cutting member;
- a respective drive spindle for each hair-cutting unit; and
- a locking mechanism for selectively setting the supporting portion in a locked condition, wherein the supporting portion unable to move in the movement direction relative to the base portion in the locked condition, or in an unlocked condition, wherein the supporting portion is able to move freely in the movement direction between the first and second positions relative to the base portion in the unlocked condition.

2. The shaver head as claimed in claim 1, wherein the locking mechanism comprises a shaft extending parallel to the movement direction and a collar arranged around the shaft for interaction with the shaft, and wherein the shaft and the collar are rotatable relative to each other about an axis of rotation extending parallel to the movement direction, to set the locked condition or the unlocked condition of the supporting portion.

3. The shaver head as claimed in claim 2, wherein the shaft has an external thread and the collar has in internal thread arranged for engagement with the external thread, wherein the external thread and the internal thread have a predefined mutual clearance in an axial direction parallel to the axis of rotation allowing movement of the shaft relative to the collar in the axial direction.

4. The shaver head as claimed in claim 3, wherein:
- in the first position, movement of the supporting portion in the movement direction further towards the base portion is prevented by mutual abutment of a first pair of abutment elements mounted in fixed positions relative to, respectively, the supporting portion and the base portion; and in the second position, movement of the supporting portion in the movement direction further away from the base portion is prevented by mutual abutment of a second pair of abutment elements mounted in fixed positions relative to, respectively, the supporting portion and the base portion.

5. The shaver head as claimed in claim 4, wherein the locking mechanism is configured to set the supporting portion in the locked condition, wherein the supporting portion is locked in the first position relative to the base portion by mutual abutment of the abutment elements of the first pair and by mutual abutment of the internal thread and the external thread.

6. The shaver head as claimed in claim 4, wherein the locking mechanism is configured to set the supporting portion in the locked condition, wherein the supporting portion is locked in the second position relative to the base portion by mutual abutment of the abutment elements of the second pair and by mutual abutment of the internal thread and the external thread.

7. A shaver head for an electric shaver, the shaver head comprising:

a base portion for connection of the shaver head to a main housing of the electric shaver;

a supporting portion mounted to the base portion;

a linear guiding structure for enabling the supporting portion to linearly move in a movement direction relative to the base portion between a retracted first position and an extended second position;

a spring member for biasing the supporting portion away from the base portion in the movement direction from the first position to the second position;

at least two hair-cutting units supported by the supporting portion, wherein each hair-cutting unit comprises an external cutting member with hair-entry openings and an internal cutting member with a plurality of cutting elements rotatable relative to the external cutting member;

a respective drive spindle for each hair-cutting unit; and a locking mechanism for selectively setting the supporting portion in a locked condition or an unlocked condition, wherein the supporting portion is locked in position in the movement direction relative to the base portion in the locked condition, and wherein the supporting portion is enabled to move in the movement direction relative to the base portion in the unlocked condition, wherein the locking mechanism comprises a shaft extending parallel to the movement direction and a collar arranged around the shaft for interaction with the shaft, wherein one of the shaft and the collar is mounted, in the movement direction, in a fixed position relative to the supporting portion and the other of the shaft and the collar is mounted, in the movement direction, in a fixed position relative to the base portion, and wherein the shaft and the collar are rotatable relative to each other about an axis of rotation extending parallel to the movement direction, to set the locked condition or the unlocked condition of the supporting portion.

8. The shaver head as claimed in claim 7, wherein the shaft has an external thread and the collar has in internal thread arranged for engagement with said external thread, wherein the external thread and the internal thread have a predefined mutual clearance in an axial direction parallel to the axis of rotation allowing movement of the shaft relative to the collar in the axial direction.

9. The shaver head as claimed in claim 8, wherein:

in the first position of the supporting portion, movement of the supporting portion in the movement direction further towards the base portion is prevented by mutual abutment of a first pair of abutment elements mounted in fixed positions relative to, respectively, the supporting portion and the base portion; and in the second position of the supporting portion, movement of the supporting portion in the movement direction further away from the base portion is prevented by mutual abutment of a second pair of abutment elements mounted in fixed positions relative to, respectively, the supporting portion and the base portion.

10. The shaver head as claimed in claim 9, wherein the locking mechanism is configured to set the supporting portion in the locked condition, wherein the supporting portion is locked in the first position relative to the base portion by mutual abutment of the abutment elements of the first pair and by mutual abutment of the internal thread and the external thread.

11. The shaver head as claimed in claim 9, wherein the locking mechanism is configured to set the supporting portion in the locked condition, wherein the supporting portion is locked in the second position relative to the base portion by mutual abutment of the abutment elements of the second pair and by mutual abutment of the internal thread and the external thread.

12. The shaver head as claimed in claim 9, wherein the locking mechanism is configured to set the supporting portion in a fully unlocked condition, wherein the supporting portion is enabled to move in the movement direction relative to the base portion over a maximum distance from the first position to the second position.

13. The shaver head as claimed in claim 9, wherein the locking mechanism is configured to set the supporting portion in a partially unlocked condition, wherein the supporting portion is enabled to move in the movement direction relative to the base portion over a limited distance from either the first position or the second position to an intermediate position between the first position and the second position which is defined by mutual abutment of the internal thread and the external thread.

14. The shaver head as claimed in claim 7, wherein the shaft is mounted in a fixed position relative to the supporting portion, and wherein the collar is mounted, in the movement direction, in a fixed position relative to the base portion and rotatable relative to the base portion about the axis of rotation.

15. The shaver head as claimed in claim 14, wherein the linear guiding structure comprises a guiding axle, mounted in the fixed position to the base portion and extending parallel to the movement direction, and a guiding bush mounted in the fixed position to the supporting portion, wherein the guiding bush is moveably guided along the guiding axle parallel to the movement direction, wherein the shaft is arranged in a fixed position relative to and circumferentially around the guiding bush, and wherein the collar is rotatable about the shaft and the guiding bush.

16. The shaver head as claimed in claim 15, wherein the shaft and the guiding bush are integrally formed.

17. The shaver head as claimed in claim 7, wherein the collar is rotatable by an electric motor or by a manually actuatable operating member.

18. The shaver head as claimed in claim 7, wherein the base portion includes a coupling structure by which the shaver head is releasably couplable to the main housing of the electric shaver.

19. The shaver head as claimed in claim 7, wherein each drive spindle comprises a coupling head for engagement with the internal cutting member of a respective one of the hair-cutting units, wherein the supporting portion is arranged centrally between the hair-cutting units, and wherein each hair-cutting unit is pivotable relative to the supporting portion about an axis extending tangentially relative to a central axis of the hair-cutting unit.

20. An electric shaver comprising:

a main housing which accommodates an electric motor; and a shaver head as claimed in claim 7 coupled to the main housing.

* * * * *